ated Aug. 23, 1960

2,950,259
PLATINUM CATALYST

Charles E. Starr, Jr., Summit, N.J., and Marnell A. Segura, Baton Rouge, La., assignors to Esso Research and Engineering Company, a corporation of Delaware No Drawing. Filed Apr. 8, 1954, Ser. No. 421,968

4 Claims. (Cl. 252—466)

The present invention relates to improvements in the preparation of platinum group metal catalysts adapted for use in various chemical processes such as hydrogenations, dehydrogenations, hydroforming of naphthas and the like. More particularly, the present invention relates to controlling the physical form of the platinum or palladium catalyst with respect to its crystallinity, and also relates to the distribution of the platinum group metal on a carrier with which it is invariably associated in forming the complete platinum group metal catalyst.

The manufacture and use of a platinum-containing catalyst is a matter of record and commercial practice. Platinum catalysts ordinarily contain about 0.3 wt. percent platinum based on the total weight of platinum and carrier. This platinum catalyst is, as stated, carried on a suitable spacing agent or support such as an active form of alumina. Various forms of alumina have been employed as the carrier for the platinum group metal in the manufacture of such catalysts.

The desireratum in preparing a platinum-containing catalyst is to form a product which has good activity and selectivity, in the process in which it is to be used, and at the same time, has good catalyst life. It has now been discovered that catalyst activity depends on at least two important attributes of a good catalyst (1) the platinum should have a crystallinity of from above 10, but below 50 A. units, and (2) the catalyst should be well distributed throughout the carrier in order to possess the largest possible surface area. Such a catalyst will possess good activity and selectivity and a reasonable catalyst life when utilized, for example, in the hydroforming of naphthas.

While the present invention relates primarily to improvements in the preparation of platinum catalyst suitable for hydroforming, the catalysts prepared according to the present invention possess utility in other processes such as hydrogenations, dehydrogenations, and other processes. However, in order to illustrate the present invention, the same will be described in terms of its preparation for and use in the hydroforming of naphthas.

Hydroforming is an operation in which virgin naphtha, cracked naphtha, or a synthetic naphtha, or a mixture of any two or more of these naphthas, is subjected in the presence of a solid catalyst and hydrogen to elevated temperatures and pressures whereby the octane value of the naphtha is greatly increased, primarily by the formation of aromatic hydrocarbons. As is known, this hydroforming operation is so conducted as to result in no net consumption of hydrogen, and in fact, the process usually results in a net production of hydrogen.

Since a platinum group metal catalyst is expensive, it is obvious that it should be prepared under conditions so as to be adapted for use at maximum efficiency. The present invention provides means for controlling the preparation of a platinum-containing catalyst by the use of X-rays, to determine the physical state of the platinum and thus to modify, if necessary, the procedure in making the catalyst responsive to the examination of the said catalyst during its preparation to control and prevent crystalline size formation to maintain it below 50 A. units.

The main object of the present invention, therefore, is to produce a platinum group metal catalyst suitably supported by such means indicated by X-ray on examination to yield a crystalline platinum product in which the platinum does contain crystals, but does not contain crystals having a size larger than about 50 A. units.

Another object of the present invention is to activate a platinum-containing catalyst by heat treatment under such conditions as to avoid the formation of large platinum crystals which process or preparation is monitored and controlled responsively to X-ray examination of the product periodically during its heat treatment for activation.

Other and further objects of the invention will appear from the following more detailed description and claims.

In order to more fully explain the present invention, the following examples are set forth.

The art in the preparation of platinum catalysts for such processes as hydroforming, hydrogenations, dehydrogenations, and other processes is extensive. In the preparation of these catalysts on an alumina base, a number of different types of alumina have been used. One of these is a commercially available alumina known as Alorco H–41 marketed by the Aluminum Company of America. Another such alumina may be prepared by reacting pure aluminum metal with an alcohol such as amyl alcohol in the presence of mercuric chloride catalyst to form an aluminum alcoholate. Upon addition of water to the aluminum alcoholate solution, a hydrous alumina is precipitated as a result of hydrolysis of the aluminum alcoholate. This alumina is then further washed with water and dried at a temperature of 210°–230° F. for a sufficient period of time to reduce the moisture content of the alumina to a value ranging from 5–20%. In some cases this alumina is further heated to a temperature of 600°–800° F. prior to use as a catalyst base. Still a third method of preparing alumina is by the reaction of sodium aluminate and aluminum sulfate. The alumina thus formed is filtered from the mother liquor to remove a substantial portion of the soluble salts such as sodium sulfate, reslurried with water and spray dried in a commercial spray drier to form microspherical particles, rewashed with water to a sulfate content of less than 0.5% expressed as $SO_4$, dried at a temperature of 500°–700° F. in a rotary kiln to a moisture content of 5–20%, and then activated at a temperature of 1200° F. for a period of 1–4 hours.

Similarly, a number of methods of preparation of platinum on alumina catalyst are known to the art. For the purposes of the invention, the following preparations have been selected.

EXAMPLE 1

A sample of H–41 alumina secured from the Aluminum Company of America was treated in a fluidized state at 900° F. with HF vapors until a total of 0.5% HF was taken up by the alumina. The HF treated alumina was cooled and impregnated with an aqueous solution of chloroplatinic acid in such ratio as to provide 0.5% platinum on the alumina. In the impregnation step sufficient liquid was used to provide a heavy slurry of the chloroplatinic solution and the alumina. While still in the slurry state the mixture was treated with $H_2S$ gas under conditions of good agitation for a period of one hour. The sulfided mixture was then dried at room temperature for 24 hours followed by an additional drying step of 12 hours at 250° F. The dried material was pilled into cylindrical pellets of $3/16''$ x $3/16''$ size and activated for a period of 2 hours at 950° F. in a muffle furnace. This material is identified as Catalyst A.

EXAMPLE 2

Another catalyst was prepared from the same H–41 alumina as above, by pre-drying the alumina for 12 hours at 250° F. The dried alumina was impregnated with a water solution of HF of such concentration as to provide 0.5% HF based on the alumina and at the same time to obtain a mixture which was thoroughly impregnated and in a slightly damp state but without any excess solution. This HF impregnated alumina was then dried for 24 hours at room temperature and 12 hours at 250° F. Completion of this preparation by impregnation with chloroplatinic acid, sulfiding with $H_2S$ gas, dried and activated, was done exactly as in Example 1 above. This catalyst is identified as Catalyst B.

EXAMPLE 3

Another portion of H–41 alumina was treated in a fluidized state with HF vapors at room temperature until 0.5% HF had been added to the alumina. This was followed by treatment with $H_2S$ gas at the same conditions until the alumina was saturated with $H_2S$. This material was then impregnated with a solution of chloroplatinic acid in sufficient concentration and quantity to provide 0.5 platinum in the well-mixed and damp material without excess fluid being present. This impregnated material was then dried at room temperature for 24 hours followed by drying at 250° F. for a period of 12 hours. The dried material was then pilled and activated in the same manner as previously described in Examples 1 and 2. This catalyst is identified as Catalyst C.

Hydroforming operations were then carried out on the portions of the same naphtha feed using these three catalysts in a 200 cc. capacity laboratory hydroforming unit. An inspection of this feed is set forth below:

| | Naphtha boiling range 200°–330° F |
|---|---|
| Gravity, °API | 54.8 |
| ASTM Distillation, °F.: | |
| Initial B.P., °F. | 228 |
| 5% | 238 |
| 10% | 241 |
| 30% | 250 |
| 50% | 262 |
| 70% | 278 |
| 90% | 303 |
| 95% | 314 |
| Final B.P., °F. | 334 |
| Recovery, percent | 98.5 |
| Residue, percent | 0.5 |
| R.V.P., lbs./sq.in. | 0.7 |
| Oct. No.: | |
| CFR-R Clear | 49.4 |
| ASTM Clear | 45.3 |
| Color (S) | +20 |
| Aniline point, °F. | 126 |
| Bromine No., c.g.s./gm. | 1 |
| Sulfur, Wt. percent: | |
| Lamp | 0.08 |
| Turb. | |
| ASTM Gum | 2 |
| Doctor | DNP |
| Corrosion, Cu strip | Pass |
| Breakdown, hours | 20 |
| R.I. @ 20° C., $n_D$ | 1.4218 |
| Sp. Disp. @ 20° C. (F–C) | 107.5 |
| Component Analysis, vol. percent: | |
| Olefins | 1 |
| Aromatics | 15 |
| Naphthenes | 41 |
| Paraffins | 43 |
| Aromatics Breakdown, vol. precent: | |
| $C_6$ | 0.05 |
| $C_7$ | 2.4 |
| $C_8$ | 4.8 |
| $C_9$ | 3.8 |
| $C_{10}$ | 0.5 |
| $C_{11}$ | 0 |
| | 11.6 |

The operating conditions and results obtained are as follows:

Operating conditions: 200 p.s.i.g., 900° F., 1 v./v./hr.— Liquid feed rate of 200–330° F. virgin naphtha

| Catalyst | A | B | C |
|---|---|---|---|
| Yield, Vol. Percent 10 RVP Gasoline | 96.5 | 95 | 91 |
| Octane No. CFR-R Clear | 97.9 | 97 | 91 |
| Pt Crystal Size by X-ray | <50 A. | <50 A. | >50 A. |

It is readily apparent from the above results that the catalysts shown by X-ray examination to have a platinum crystal size of less than 50 A. were both of excellent quality, whereas, in Catalyst C, although it was of the same composition and prepared from these same materials but had a platinum size of greater than 50 A. gave much poorer performance.

As previously mentioned, it is essential in the preparation of satisfactory platinum catalysts to secure a very high degree of distribution of the platinum metal on the base material, it is also important to secure the proper amount of platinum metal. Improper distribution cannot be detected readily by ordinary means. According to this invention, this difficulty is overcome by routine examination of the catalyst by means of X-ray techniques. In these examinations catalysts which show a platinum crystal size of less than 50 A. possess the desired distribution, whereas, those catalysts showing a platinum crystal size of greater than 50 A. are deficient in this respect and will be unsatisfactory catalysts.

In the commercial application of this method of control in the preparation of satisfactory catalysts, the particular method of preparation is not a factor. In all methods of preparation, the catalytic material is examined at appropriate intervals by means of X-ray. In this examination, the powder or pills would be heated for a period of 2 hours at 900° F. in air and then by means of X-ray techniques the platinum crystallinity and platinum content is determined. Production represented by samples showing less than 50 A. platinum crystal size and of the correct platinum content is considered acceptable for charging to a hydroforming unit. Production represented by samples showing greater than 50 A. platinum crystal size or less than the prescribed platinum content is unacceptable and would be reprocessed to secure a satisfactory catalyst. In addition to preventing unsatisfactory catalysts from being charged to a hydroforming unit with resulting high economic losses, this method of catalyst preparation control offers a means of quickly correcting catalyst manufacturing deficiencies and thus will afford savings in the preparation cost of satisfactory catalysts. These deficiencies that may occur will depend to a large extent on the method of preparation. Such deficiencies might be (1) insufficient concentration of the impregnating chloroplatinic acid solution, (2) insufficient sulfiding or non-uniform sulfiding, (3) employment of excessive temperatures in the drying and/or activation of the catalyst.

To correct insufficiency of the catalyst, the following methods may be used for reprocessing unsatisfactory catalysts: (1) If the catalyst contains the correct platinum content, proper distribution of the platinum may be obtained by treatment of the material with chlorine gas at temperatures of 700°–1000° F. (2) If the catalyst contains insufficient platinum content, it may be returned to the impregnating step and the additional proper amount of platinum added.

To recapitulate briefly, the present invention relates to a method of preparing catalyst under control conditions which in substance and effect amount to monitoring the preparation by means of X-ray examination to determine crystalline size of the platinum and dispersion on the base, and modifying the process of preparing the catalyst responsive to the X-ray indications, and also rejecting as a result of the X-ray examination unsatisfactory catalyst.

Many modifications of the present invention will be obvious to those skilled in the present art without departing from the spirit thereof.

What is claimed is:

1. In a process for manufacture of an alumina supported platinum catalyst having high hydroforming activity in which the following steps are carried out:

(1) providing a suitable adsorptive alumina support,
(2) impregnating said support with a solution of a platinum compound, and
(3) activating the impregnated alumina support by an activating heat treatment, the improvement which comprises heating the impregnated alumina support at a temperature of at least about 900° F. in said heat treatment for an appropriate interval of time to form platinum metal crystallite particles from the impregnating platinum compound solution and controlling the activating heat treatment to keep the particles of platinum metal from growing to a crystallie size exceeding 50 A. as shown by an X-ray test determination.

2. In the process of claim 1, interrupting the activating heat treatment after an interval of time then exposing the catalyst to an X-ray test for determination of crystal size of the platinum on the alumina support for controlling the temperature and time of the activating heat treatment of the impregnated support so as to prevent crystal size growth to above 50 A.

3. In the process of claim 1, the step of giving improved distribution to the platinum in the catalyst given the activating heat treatment by treating the catalyst with chlorine at temperaures of 700° to 1000° F.

4. An activated platinum-alumina catalyst containing from about 0.2 to 0.5% platinum by weight based on the the total weight of platinum and alumina characterized in that the platinum is distributed as crystallites having a particle size not exceeding 50 A. throughout the alumina as determined by X-ray test.

References Cited in the file of this patent

UNITED STATES PATENTS

| | | |
|---|---|---|
| 2,483,500 | Long | Oct. 4, 1949 |
| 2,602,772 | Haensel | July 8, 1952 |
| 2,611,736 | Haensel | Sept. 23, 1952 |
| 2,611,749 | Haensel | Sept. 23, 1952 |
| 2,623,860 | Haensel | Dec. 30, 1952 |
| 2,625,504 | Haensel | Jan. 13, 1953 |
| 2,739,945 | Thorn | Mar. 27, 1956 |